Jan. 26, 1965  A. C. KEATHLEY  3,166,899
IGNITION SYSTEM FOR SOLID ROCKET BOOSTER CLUSTER
Filed June 7, 1962
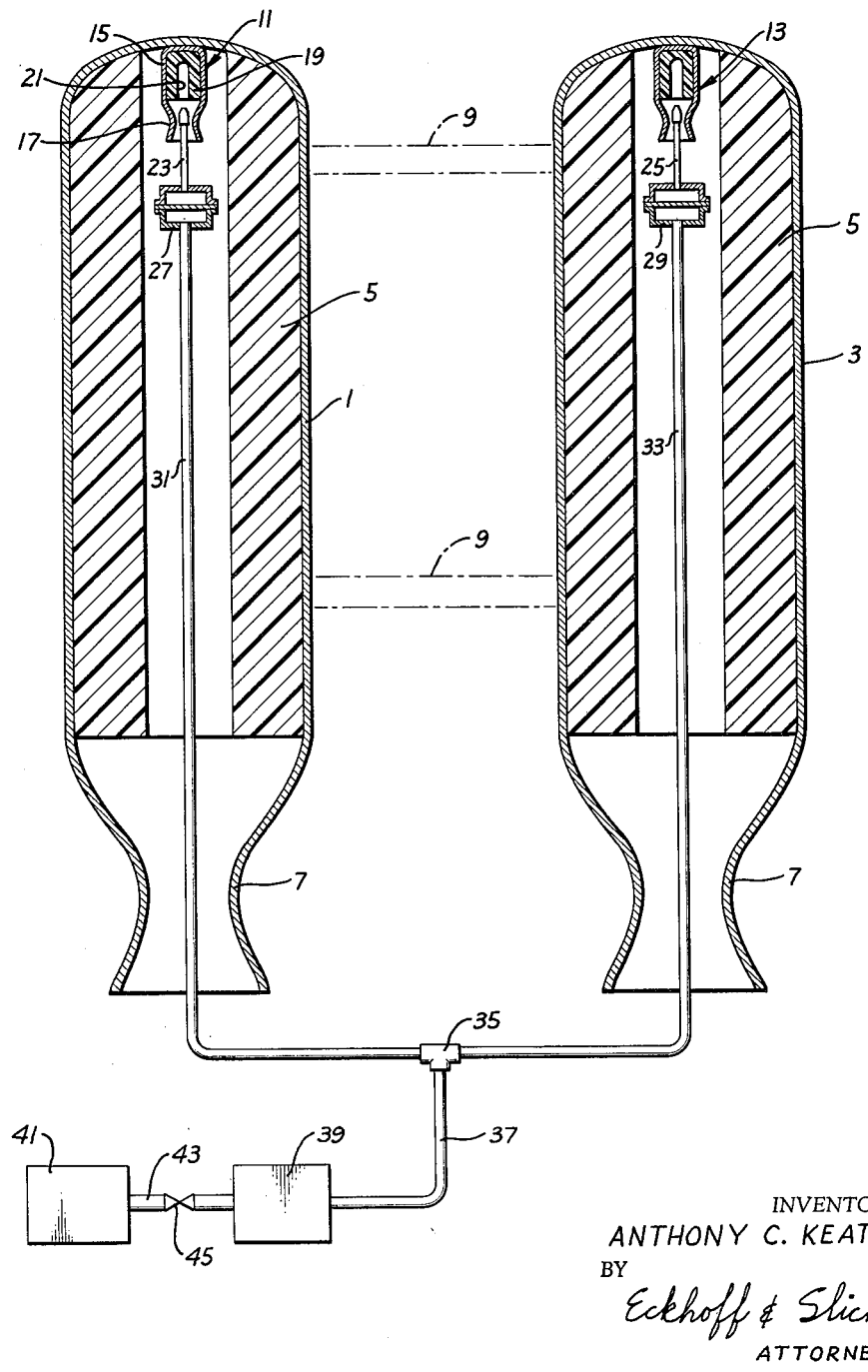
INVENTOR.
ANTHONY C. KEATHLEY
BY
Eckhoff & Slick
ATTORNEYS 3,166,899
IGNITION SYSTEM FOR SOLID ROCKET BOOSTER
CLUSTER
Anthony C. Keathley, Sunnyvale, Calif., assignor to
United Aircraft Corporation, a corporation of
Delaware
Filed June 7, 1962, Ser. No. 200,697
2 Claims. (Cl. 60—35.6)

This invention relates to rocket motors and more particularly relates to a novel ignition system for clustered rocket motors.

In any rocket motor it is necessary that the thrust vector of the motor pass through the center of gravity of the motor to prevent eccentric moments which would require large correction forces. When using a number of motors in a cluster, such as a cluster of solid propellant rocket motors used as a booster, there is always the possibility that one of the motors will not fire so that the thrust vector of the cluster will not pass through the center of gravity of the cluster. It is therefore highly desirable to take every precaution in clustered rocket motors to see that all of them ignite, and preferably ignite at substantially the same time. Moreover it is highly desirable to provide an igniter which requires no wires or other ignition actuation means passing through the case wall causing weakness and points of stress concentration.

It is therefore a primary object of the invention to provide an ignition system for a cluster of rocket motors which is simple and reliable in operation.

A further object of this invention is to provide a system which achieves reliability without resorting to initiator redundancy and the complex network of wires normally necessary to achieve this redundancy.

Another object of this invention is to provide a safe but effective ignition system which eliminates the usual safe and arm devices.

Another object of this invention is to provide a reliable method of igniting rocket motors without resorting to the manifolding of hot gases.

Another object is to provide a safe and effective method for igniting rocket motors using a hypergolic principle yet not employing the bulky equipment which has heretofore been proposed wherein a hypergolic fluid is injected into the burning port of the rocket motor itself.

Generally speaking, the objects of this invention are achieved by providing each motor of the cluster with a rocket type igniter wherein the igniter contains the solid component of a hypergolic mixture and providing means for injecting the liquid component of the hypergolic mixture into the igniter.

The invention is not limited to the use of any specific hypergolic materials, and any of the hypergolic materials well-known to those skilled in the art such as chlorine trifluoride or bromine pentafluoride which ignite on contact with normal solid propellants such as polyurethane, polybutadiene acrylic acid, carboxylated butadiene acrylonitrile in combination with oxidizers such as ammonium perchlorate or ammonium nitrate may be employed.

The sole figure of the drawing is a sectional view of a cluster of two rocket motors embodying the present invention.

Referring now to the drawing by reference characters, there is shown a first rocket motor 1 and a second rocket motor 3 each of which has a conventional propellant grain 5 therein. Each of the motors has a nozzle assembly 7 and the motors are held in clustered formation by means of the structure 9 shown in dash-dot lines. Each of the motors is provided with a rocket type igniter, that for motor 1 being generally designated 11 and that for motor 3 being generally designated 13. Each of the rocket-type igniters is essentially a miniature rocket and has a casing 15, a nozzle 17 and a propellant grain 19, the propellant grain being of a nature to react with a hypergolic fluid. Each of the igniters also has a central burning port 21. A line 23 is extended into the burning port of igniter 11 and a similar line 25 is extended into the central burning port of the igniter 13, the lines 23 and 25 being each connected to a pressure release valve 27 and 29 respectively. The valves 27 and 29 are of identical structure, as illustrated. The pressure release valves 27 and 29 are connected to lines 31 and 33, being joined by a T 35 to a common line 37. A tank 39 is provided of a hypergolic fluid while a second tank 41 is provided of a suitable pressurizing fluid such as carbon dioxide or nitrogen. A line 43 provided with a valve 45 connects the tank of pressurizing fluid 41 to the tank of hypergolic fluid 39.

To operate the device, the valve 45 is opened, building up pressure on the hypergolic fluid in the tank 39 and, as soon as sufficient pressure has built up in the tank, pressurizing the hypergolic fluid, the pressure will cause the devices 27 and 29 to act, simultaneously releasing the hypergolic fluid through the lines 23 and 25 and thus into the burning ports of the two igniters 11 and 13. This will fire the igniters which in turn will then fire the main propellant grains 5.

Although certain specific equipment has been described such as the use of a pressurizing fluid and the employment of a burst diaphragm for the sudden release of the hypergolic fluid, this equipment was described only as suitable equipment which may be employed and the invention is not limited thereto. Similarly, certain hypergolic fluids have been described as well as propellants but the invention is not limited to these specific materials.

Although two motors have been described as constituting a cluster, this was merely for convenience in illustration and the cluster might comprise a larger number of individual motors.

It is believed apparent from the foregoing that I have provided a simple yet effective system for the positive ignition of solid propellant rocket motors when fired in a cluster.

I claim:
1. An ignition system for solid propellant rocket motors comprising in combination:
 (a) a plurality of solid propellant rocket motors held in clustered relationship;
 (b) each of said motors having a case with a closed forward end and a propellant grain with a central burning port and a nozzle at one end of the case;
 (c) each of said motors having a rocket-type igniter attached to the inside of the closed forward end of the casing at the end of the central burning port opposite the nozzle;

(d) each of said rocket-type igniters having a solid propellant grain therein;

(e) lines for conducting a fluid, one of said lines extending through the throat and burning port of each of the rocket motors and terminating within the rocket-type igniters;

(f) a pressure relief valve in each of said lines;

(g) means for supplying a fluid under pressure through said lines, said fluid being hypergolic with the solid propellant grain of the rocket-type igniter;

(h) whereby when said fluid is introduced under pressure into said lines, said pressure relief valves will release the fluid substantially simultaneously into each of the rocket-type igniters, firing all of the solid propellant motors at once.

2. The system of claim 1 wherein the pressure relief valves are burst diaphrams.

References Cited by the Examiner

UNITED STATES PATENTS

| | | | |
|---|---|---|---|
| 2,515,048 | 7/50 | Lauritsen | 102—49 |
| 2,693,675 | 11/54 | Schaffer | 60—39.82 X |
| 2,974,484 | 3/61 | Cooley. | |

FOREIGN PATENTS 74,261    3/54    The Netherlands.

SAMUEL LEVINE, *Primary Examiner.*